June 30, 1959   A. E. PECH   2,892,723
METHOD OF PREPARING EVAPORATED MILK AND LIKE PRODUCTS
FOR PRESERVATION IN SEALED CONTAINERS
Filed May 2, 1956   2 Sheets-Sheet 1
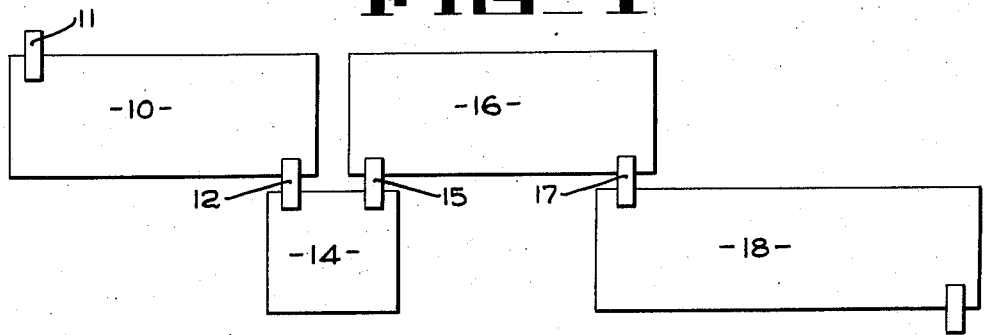
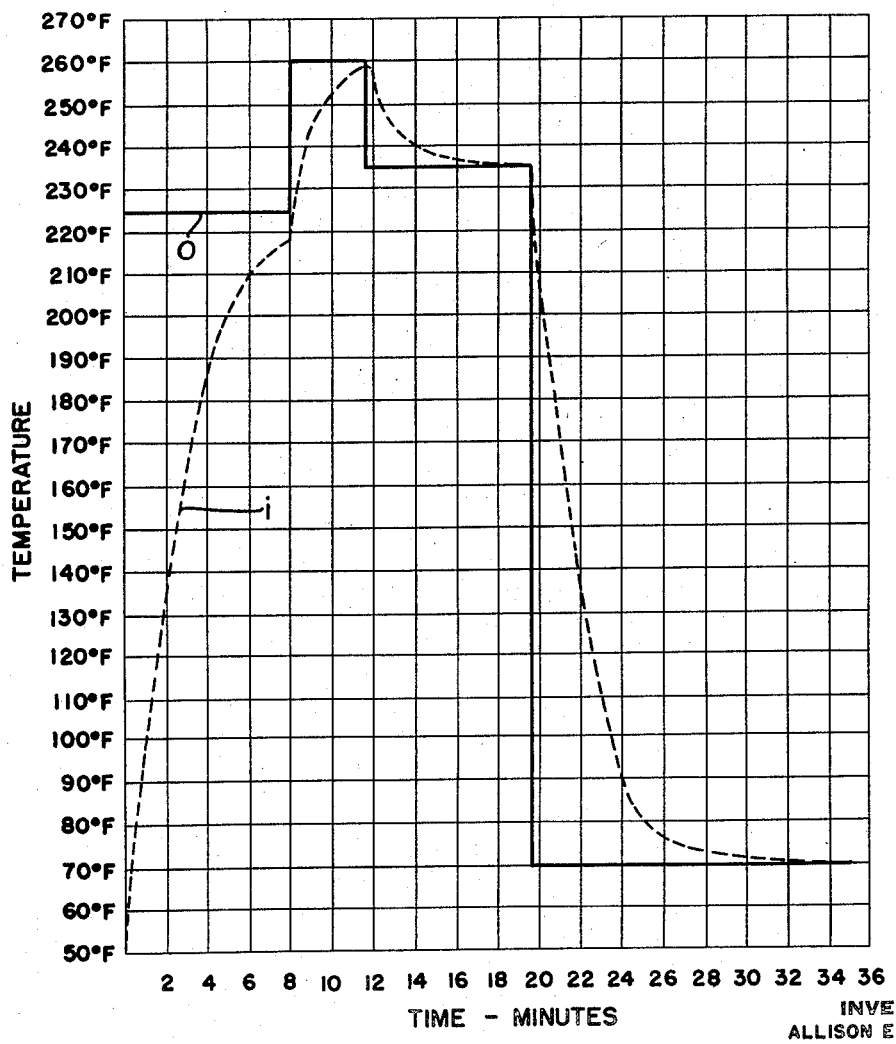
INVENTOR
ALLISON E. PECH
BY *Hans E. Hoffmeister*
ATTORNEY June 30, 1959　　　　　A. E. PECH　　　　2,892,723
METHOD OF PREPARING EVAPORATED MILK AND LIKE PRODUCTS
FOR PRESERVATION IN SEALED CONTAINERS
Filed May 2, 1956　　　　　　　　　　　　　2 Sheets-Sheet 2

INVENTOR
ALLISON E. PECH
BY Hans G. Hoffmeister
ATTORNEY

United States Patent Office 2,892,723
Patented June 30, 1959

2,892,723

METHOD OF PREPARING EVAPORATED MILK AND LIKE PRODUCTS FOR PRESERVATION IN SEALED CONTAINERS

Allison E. Pech, San Jose, Calif., assignor to Food Machinery and Chemical Corporation, San Jose, Calif., a corporation of Delaware Application May 2, 1956, Serial No. 582,111

11 Claims. (Cl. 99—212)

This invention relates to methods of preparing evaporated milk and like products for preservation in sealed containers known as cans.

This application is a continuation-in-part of my copending U.S. application, Serial No. 274,036, filed February 28, 1952, now abandoned.

When evaporated milk is to be preserved in cans, it must be sterilized which is usually accomplished by subjecting it in bulk or sealed within the cans to temperatures of at least 240° F. for a sufficient length of time to kill substantially all the spoilage micro-organisms contained therein. When evaporated milk is subjected to such high temperatures for the period necessary for sterilization it may coagulate. The ability of milk to withstand sterilizing temperatures without coagulation is known as the "heat stability" of milk. This stability varies greatly depending on many factors, such as the place of origin of the milk and the season of the year.

Treatments have been devised to increase the heat stability of unstable milks. For this purpose the raw milk may, prior to evaporation, be subjected to carefully controlled elevated temperatures, a treatment known under the name "forewarming." In addition, chemical stabilizers may be added, such as di-sodium phosphate. Furthermore, to prevent the formation of coagulation deposits upon the container walls (so-called burn-on), the canned evaporated milk, instead of being subjected abruptly to the sterilizing temperatures, may first be gradually preheated to temperatures somewhat below the actual sterilization temperatures, a treatment known as "preheating."

Sterilized evaporated milk, when stored in sealed cans, exhibits various forms of quality deterioration, one being known as fat separation, i.e., the fat and serum separate into two distinct layers within the can. Another form of deterioration that may occur in canned evaporated milk upon prolonged storage is gelation, commonly known by the name of age thickening, that is to say, the total contents of a can turn into a homogeneous gel. The ability of canned milk to stand prolonged storage without these changes in its physical condition is known as the "storage stability" of milk.

It has been found that the storage stability of evaporated milk sterilized at temperatures commonly used in commercial practice may be improved by extending the heat treatment to the point where the first visible signs of coagulation appear in the form of fine grains, known as film grains. Milk is commonly prepared for sterilization at ordinary temperatures by forewarming and chemical stabilization so that the time required for film grain formation is only slightly in excess of the time required for sterilization. Sterilization of milk at ordinary temperatures results in some darkening of the milk and imparts a cooked flavor, both of which increase as time of sterilization is extended.

It is well recognized in the art of canning evaporated milk that at sterilizing temperatures higher than those normally employed, bacterial destruction occurs much more rapidly than the darkening, flavor deterioration, and grain forming changes accompanying heat treatment. To preserve the color and flavor of the product to the greatest degree would in fact postulate that the treatment be reduced to the absolute minimum time by the application of the highest possible sterilization temperature. However, milk so sterilized, while little changed in color or flavor, is far from the grain point and is of very low viscosity. Not only does the low viscosity impair the marketability of the product, but the product will rapidly separate or gel or both within a relatively brief period becoming completely unmarketable. In the sterilization of canned evaporated milk it has, therefore, been necessary in the past, aside from providing adequate conditions of time and temperature to achieve commercial sterility, to strike a compromise between the temperatures and periods of exposure thereto that are desirable for the maintenance of color and flavor and those that are necessary to obtain adequate storage stability and a desired degree of viscosity—a compromise that was frequently complicated by either poor or excessive heat stability of the particular batch of milk to be canned. The results have been far from satisfactory for, depending upon the characteristics of the particular type of milk to be preserved, the first signs of film grain formation indicative of resistance of the final product to fat separation and gelation, may not occur until after the color and flavor of the product have been seriously impaired, or they may appear before proper sterility of the product is assured so that the product may have completely coagulated by the time it is properly sterilized; or if the first signs of film grain formation appear after sterility of the product is assured and while the color and the flavor of the product are still satisfactory, coagulation may proceed so rapidly as to preclude proper control of the process resulting in excessive coagulation of the product before the sterilization process can be effectively terminated.

It is an object of the present invention to provide a method of preparing a sterilized evaporated milk of inherently low heat stability for preservation in sealed containers in a manner that will impart to said milk satisfactory storage stability.

Another object is to provide a dependable method of preparing a sterilized, evaporated milk for preservation in sealed containers that combines excellent color and flavor with extended storage stability and high viscosity.

Still another object is to provide a method of preparing evaporated milk for storage in sealed containers which involves the high-temperature, short-duration sterilization process with its desirable results as to color and flavor of the product, and which yields at the same time a product of high viscosity and excellent storage stability.

Furthermore, it is an object to provide a heat treatment for evaporated milk which, while effective to properly sterilize the milk without substantial impairment of the color and flavor thereof, produces such a slow coagulation rate as to avoid any criticality in the appearance of film grain formation.

An additional object is to provide a method of preparing milk for preservation in sealed containers which permits the application of high sterilization temperatures under agitation to preserve the natural color and flavor of the product to a high degree, and yet establishes a high viscosity and excellent storage stability.

A further object is to provide a method of sterilizing milk of low heat stability for extended storage in sealed containers without need, or with a minimized need, to resort to chemical additives to protect the milk from harmful coagulation during the sterilization process.

The above mentioned deficiencies of canned evaporated milk are especially prevalent in the case of milk sterilized in bulk and canned under aseptic conditions. For instance, when milk is sterilized while flowing through tubular heaters, instead of being confined in sealed containers, it may be heated very rapidly to the highest possible sterilizing temperatures so that adequate sterility may be obtained without significant impairment of its color and flavor. The viscosity of such flash sterilized milk, however, is very low and when canned under aseptic conditions, fat separation and age thickening will occur very early in the storage period.

Another object of the invention is, therefore, to provide a process of preparing milk for preservation in sealed containers with the hereinbefore mentioned advantages as to viscosity, storage stability and palatability, that is equally applicable to in-can sterilization and to bulk sterilization with subsequent canning under aseptic conditions.

In accordance with my invention, I obtain proper sterility of evaporated milk without appreciable impairment of its color and flavor and yet secure the desired degree of viscosity in the finished product and high resistance to age thickening and fat separation, by separating the actual sterilization process from the heat treatment intended to establish its physical characteristics, i.e., high viscosity and high storage stability. This I accomplish by subjecting the evaporated milk, which may or may not have been forewarmed or otherwise treated to increase its heat stability, to a high sterilizing temperature for at least the time necessary to obtain the required degree of freedom from spoilage organisms but reduce the temperature of the sterile product rapidly to a materially lower level in the neighborhood of, and preferably somewhat above, the boiling point before the formation of visible film grain; and at this new temperature level which is too low to impair the color and the flavor of the product to any appreciable degree, I maintain the milk until it reaches the desired degree of viscosity and exhibits the first signs of film grain formation indicative of stability against fat separation and age thickening.

For instance, after a relatively rapid preheating of the evaporated milk in closed cans to about 218° F. I raise the temperature of said milk to about 258° F., for example, which may be accomplished by holding the cans for at least 3.5 minutes at 260° F. This accomplishes the substantial sterilization without appreciable impairment of the color and flavor of the product but is not long enough to form visible film grain. This substantial degree of sterilization may be obtained by heating the milk to any temperature above 250° F. and holding the milk at this temperature for a sufficient time. Immediately thereafter I lower the temperature of the product to about 235° F. which is preferably accomplished by immersion of the cans in water under pressure at the aforementioned temperature and hold it at said temperature for 8 minutes. During the first portion of this treatment at the lower temperature, sterilization is completed and thereafter the physical characteristics are developed at approximately 235° F. If desired, the sterilization may be completed at a milk temperature of 250° F. or above by holding the milk for the necessary length of time, after which it may be treated at the lower temperature. The product may then be cooled to the storage temperature in the normal manner. I have found that by providing for said low temperature heat treatment, subsequent to the actual sterilization of the product, I am able to impart to the sterilized product, a desirable degree of viscosity and high stability against age thickening and fat separation without substantial impairment of its color and flavor; and by performing the heat treatment for establishing the storage stability of the product at materially lower than the usual sterilizing temperatures, I avoid any criticality in the appearance of the desired film grain formation so that I am better able to control to the most desirable degree the film grain coagulation and I am then able to terminate said treatment upon attainment of the proper consistency without danger that the product may coagulate excessively.

The steps of my invention may be carried out with equal success whether the evaporated milk is sterilized in cans or in bulk and subsequently filled into cans under aseptic conditions.

In the accompanying drawing:

Fig. 1 is a block diagram illustrating an exemplary process in accordance with the invention for preparing evaporated milk for preservation in sealed containers, wherein the milk is sterilized within said containers;

Fig. 2 is a graph illustrating the various temperatures to which the milk within the containers is subjected during the process illustrated in Fig. 1;

Figure 3:
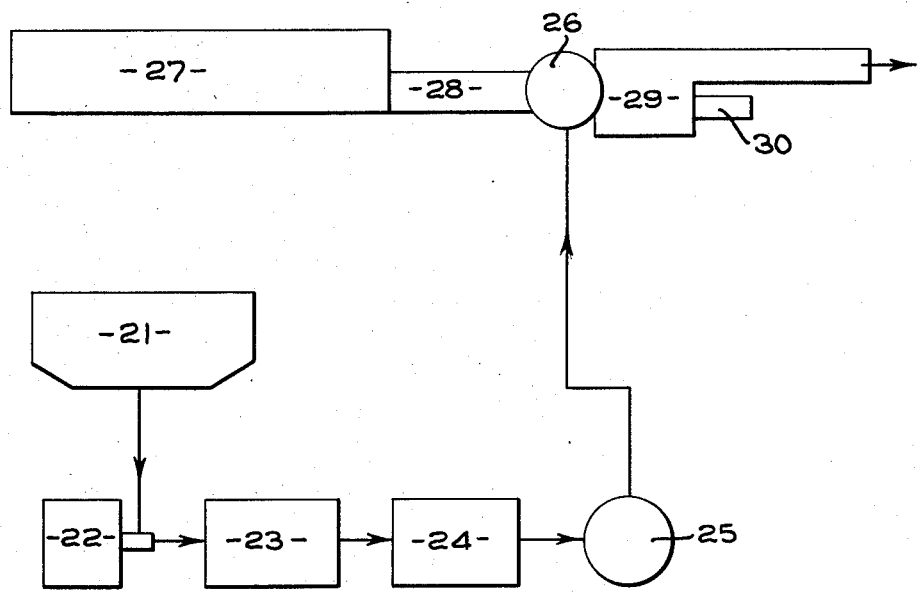
Fig. 3 is a block diagram similar to Fig. 1 illustrating another exemplary process of the invention wherein the milk is sterilized in bulk and thereafter filled into the containers under aseptic conditions.

Having first reference to Fig. 1, sealed cans containing evaporated milk are first delivered into a preheater retort 10 which may comprise a cylindrical shell provided with a helical can guide along its inner surface. Rotatably mounted within said shell is a reel having can pusher bars which advance the cans along said helical can guide as the reel is rotated within the shell. Retorts of this type are well known in the art of sterilizing food products and are described in U.S. Patent No. 2,211,801 to A. R. Thompson, dated August 20, 1940.

In the particular example of the invention which I am about to describe floated type vent-hole milk cans 300 x 400 mm. in size, containing evaporated milk were introduced into the retort 10 though the entrance valve 11 thereof. The heating medium within the retort was a mixture of air and steam proportioned to establish a temperature of 225° F. and the reel within the retort was rotated with such a speed that each can required about 8 minutes to pass through the retort during which time the temperature of the milk within the cans rose from the filling temperature of about 50° F. to about 218° F.

Reverting to Fig. 1, the cans upon leaving the preheater retort 10 pass through the transfer valve 12 into the sterilization retort 14 which may be of the same construtcion as the preheater retort 10, but contains a steam atmosphere as a heating medium. In the exemplary embodiment of the invention here described, the steam atmosphere within the sterilizer retort 14 was held at a temperature of 260° F. and the cans were arranged to pass through said sterilizer retort in about 3½ minutes during which time the temperature of the evaporated milk within the cans rose rapidly to about 258° F. After the cans had passed through the sterilizer retort 14 under the conditions recited above, the evaporated milk contained therein was substantially sterilized yet its color and flavor were practically unimpaired due to the brevity of the sterilization process to which it was subjected. Its viscosity, however, was still very low and its physical condition was such that it would have exhibited fat separation or age thickening after a brief period of storage.

The cans were, therefore, passed through a pressure transfer valve 15 into a second cooker retort 16 that was identical in construction and size to the previously described retorts 10 and 14. In said retort 16, the substantially sterilized product was abruptly subjected to a materially lower temperature which, while insufficient to appreciably affect the color and flavor of the product, was still sufficiently high to produce, during the time required for the cans to pass through the retort, those physical changes in the milk that increase its viscosity and establish a satisfactory storage stability.

In the exemplary embodiment of the invention here described, the time required by the cans to pass through the retort 16 was 8 minutes, as in the case of the preheater retort 10, and a temperature of about 235° F. in said retort 16 was found to be effective to establish the desired degree of viscosity and produce appearance of the first signs of film grain formation by the time a can reached the exit valve 17 of said retort 16. To effect the change from the temperature to which the milk was heated in the sterilizing retort 14 to the desired treatment temperature in retort 16 as quickly as possible, the use of a fluid heating medium, such as water, was found to be most effective in retort 16.

From retort 16 the exit valve 17 passes the cans directly into a cooling tank 18 which abruptly terminates the after-sterilization heat treatment to which the milk was subjected in retort 16 preventing excessive coagulation in the finished product.

In Fig. 2, the abscissa represents time and the ordinate represents the temperature. The full line $o$ illustrates the different temperatures to which a can was exposed, and the periods of such exposure, as it passed successively through the preheater 10, the sterilizer 14, the after-heater 16 and into the cooler 18. The broken line $i$ illustrates the mean temperature changes of the evaporated milk itself during passage of the cans through the various treating chambers. Said line $i$ demonstrates that the evaporated milk was rapidly preheated to about 218° F. in retort 10, and was then subjected to a high, yet brief, sterilization process reaching a temperature close to 258° F. whereupon its temperature was lowered to about 235° F. by holding the cans at a temperature of 235° F. for about 8 minutes to establish its physical characteristics, whereupon the temperature of the product was rapidly lowered to about room temperature by transfer of the cans into the cooling tank 18 where the cans are held at a temperature of 60–100° F. for about 10 minutes.

The milk processed in the manner illustrated in Figs. 1 and 2 retained its color and flavor to a remarkable degree, was of high viscosity and showed greatly improved storage properties, especially with respect to fat separation and age thickening.

Referring now to Fig. 3, evaporated milk was drawn by a pump 22 from a supply tank 21 and delivered into a tubular sterilizer 23 wherein its temperature was rapidly raised to about 300° F. which was effective to adequately sterilize the milk during the few seconds required by the milk to flow through the sterilizer. Said rapid sterilization process left the milk in excellent condition as regards color and flavor. The product thus sterilized was then conducted into a heated tank 24 wherein its temperature was rapidly lowered to a degree that was so chosen as to produce the first signs of film grain formation in the time necessary for the milk to flow through said tank. In the exemplary embodiment of the invention illustrated in Fig. 3, the temperature maintained in the tank 24 was 230° F. and the time required to produce the first signs of film grain formation in the product was about 6 minutes. From the unit 24, the milk was then conducted into a cooler 25 where its temperature was rapidly lowered to temperatures of the order of 90° F.

From the cooler 25 the sterilized product may then be delivered to an aseptic filler station 26 where it is filled into cans that have previously been sterilized by contact with superheated steam in a can sterilizer 27, and which are supplied in sterilized condition to said filler station 26 through a corridor 28 containing a sterilizing atmosphere of superheated steam. From the filler 26, the filled cans are conveyed to an aseptic closing machine 29 which receives sterilized can covers from a cover sterilizer represented by the block 30. The cans emerging from the can closing machine may then be transferred to a suitable storage place.

Figure 4:
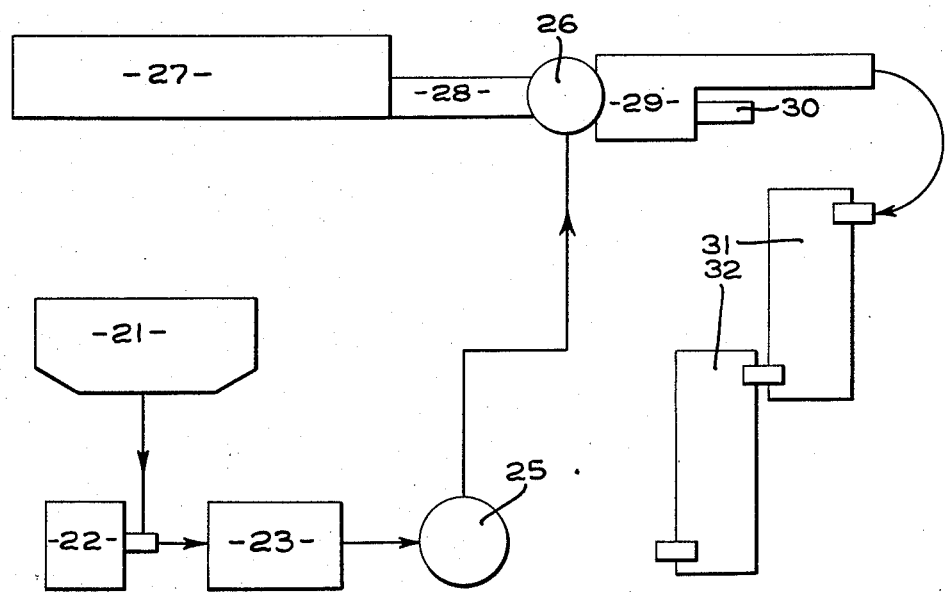
Fig. 4 is a block diagram similar to Fig. 3 representing a modified form of the aseptic milk canning process illustrated in Fig. 3.

Fig. 3 illustrates only one example of the manner in which the principles of my invention may usefully be employed in the aseptic canning art, to yield a product that does not only excel in color and flavor but possesses also high viscosity and is of outstanding storage stability where formerly only products of poor viscosity and very limited storage stability were obtainable by aseptic canning methods. As will be understood by those skilled in the art, the principles of my invention may be applied to the aseptic canning art in ways different from the example specifically illustrated in Fig. 3; that is to say, the stabilizing "after-heating" may be fitted into the aseptic canning process at points other than between the flash sterilization unit 23 and the cooler 25. For instance, upon sterilization the milk may be delivered directly to the cooler and the cooled milk may then be filled into and sealed within the cans in the conventional manner as illustrated in Fig. 4. Upon leaving the can closing station 29, however, and before the cans are stored away, they may be conducted through an after-heating unit 31 that may be similar in construction to the retort 16 of the canning layout illustrated in Fig. 1, there to be exposed to temperatures between 220° F. and 235° F. for the time necessary to produce the first signs of film grain formation in the canned product; and the cans emerging from the after-heating unit 31 are conducted through a suitable cooling unit 32 before they are stored away.

Milk of exceptionally low heat stability may be treated in the customary manner by forewarming and preheating and/or by the addition of stabilizing salts before subjecting it to the sterilization process and the after-heating process of the invention. In general, when sterilizing milk in accordance with the present invention, there is less need to resort to the mentioned heat-stability increasing treatments, but if such preliminary, heat-stability increasing treatments should become necessary in the case of milks of exceptionally low heat stability, they do not interfere with, and in no way detract from the effectiveness of the process of the invention in establishing a high degree of viscosity and storage stability without sacrifice in the palatability of the final product. On the other hand, milk of high heat stability is usually of low viscosity and extension of the sterilization process beyond the time required for sterility to increase its viscosity results usually in loss of flavor and discoloration of the final product. By the process of my invention as described above, the sterilization of the product need not be carried beyond the brief duration required to establish the necessary sterility, but may be discontinued as soon as such sterility is secured and before loss of flavor and discoloration set in, whereupon the desired degree of viscosity and storage stability are established by the separate heating process of the invention at a materially lower temperature that has no appreciable effect upon the color and the flavor of the finished product.

In the case of milks of exceptionally high natural heat stability, such as would require excessive prolongation of the after-sterilization heat treatment to produce the first signs of film grain formation, it is advisable to add a chemical de-stabilization agent, such as calcium chloride, to the milk so as to shorten said after-sterilization heat treatment. The same is true for milks which in their natural condition are of a relatively low heat stability but acquire a high heat stability as a result of the brief high temperature sterilization process to which they are subjected in accordance with the invention as previously described. Such types of milks, whether their high heat stability is natural or is acquired during the sterilization process, are preferably canned by an aseptic canning process of the type illustrated in Fig. 3 since such a process permits the addition of said destabilization agents while the milk is subjected to the after-sterilization heat treatment, so that the effect of the additive may be observed and its amount properly proportioned. Care must be taken, however, that the de-stabilization agents added to the milk during an aseptic canning process are in a sterile condition. Similarly where a milk of natural relative low heat stability is encountered and which milk did not respond as stated above to acquire a high heat stability from the brief high temperature sterilization phase of this process; such type of milk could readily be improved chemically by the addition of a sterile stabilizing agent such as disodium phosphate while the milk is subjected to the after-sterilization heat treatment.

I have described my invention as applied to fluid concentrated milk, and it will be understood that my invention may be effectively applied to milks more highly concentrated than either conventional American or British standard evaporated milk. In fact, the process of the invention is particularly useful in canning 3:1 milk concentrates. As is well known, the heat stability of concentrated milks decreases rapidly with increasing concentration thereof and it has therefore been practically impossible to can milk beyond a certain degree of concentration. Highly concentrated milk can only be sterilized by the briefest application of high sterilizing temperatures which leaves the milk in a condition of limited storage stability. If the sterilization period were extended to improve the storage stability of the product, excessive coagulation would occur immediately and render the product unmarketable. By the process of the present invention I am able to impart high storage stability to highly concentrated milks without producing excessive coagulation therein. The invention will also yield beneficial results when applied to processes for preserving cream, especially the type of cream processed to be abnormally rich in solids-non-fat as described in the U.S. Patent No. 2,603,568 to Victor Nelson. The same is true for concentrated skimmilks, such as are used in the preparation of vitamin concentrates. Therefore, whenever the term "evaporated milk" is mentioned in the specification and in the appended claims, it is to be understood as including not only fluid evaporated milk of any desired concentration and whether made from full milk or from skim, but also cream and especially the type of cream described in the above quoted patent. Furthermore, since the natural composition of milks varies widely depending on their place of origin, the seasons and the particular breed of cows, it will be understood that the temperatures and the times of exposure to these temperatures as stated in the specification and claims are subject to some variations.

I claim:

1. The method of preparing evaporated milk for storage in a sealed container which comprises heating the milk to a high sterilization temperature, lowering the temperature of the milk before film grain formation occurs to a temperature within the range between 235° F. and the boiling point, maintaining the milk at said lower temperature level until film grain formation occurs, and cooling the milk to a temperature below the boiling point.

2. The method of preparing evaporated milk for storage in a sealed container which comprises heating the milk to a temperature of at least 250° F., for at least the time necessary to obtain adequate sterility, lowering the temperature of the milk before film grain formation occurs to a temperature within the range between 235° F. and the boiling point, maintaining it within said temperature range until film grain formation occurs, and thereafter cooling it promptly to a temperature below the boiling point.

3. The method of preparing evaporated milk for storage in a sealed container which comprises heating the milk to a temperature of at least 250° F. for at least the time necessary to obtain adequate sterility, lowering the temperature of the milk to a temperature within the range between 235° F. and the boiling point before film grain occurs, maintaining it within said range until film grain formation occurs, and thereafter cooling it promptly to a temperature below the boiling point.

4. The method of preparing evaporated milk for storage in a sealed container which comprises heating said milk to temperatures of at least 250° F. for at least the time necessary to secure adequate sterility, lowering the temperature of the milk to a substantially lower temperature level before film grain formation occurs, holding the milk at a temperature within the range between 235° F. and the boiling point until film grain formation occurs, and thereafter cooling it promptly to a temperature below the boiling point.

5. The method of preparing evaporated milk for storage in a sealed container which comprises heating said milk while sealed within the container to a temperature of at least 250° F. for at least the time necessary to carry the sterilization to a point at which the milk is substantially sterile, lowering the temperature of the milk rapidly to a temperature within the range between 235° F. and the boiling point before film grain formation occurs by immersion of the sealed can into water under pressure at said lower temperature, maintaining the milk within said temperature range until film grain formation occurs, and thereafter cooling it promptly to a temperature below the boiling point.

6. The method of preparing evaporated milk for storage in a sealed container which comprises successively heating the milk to a first temperature of at least 250° F. and then lowering the temperature of the milk to a second temperature within the range of between 235° F. and the boiling point, the length of time the milk is held at said first temperature being such that the sterilization of the milk will be completed by the treatment at this temperature combined with the initial portion of the treatment at said second temperature; maintaining the treatment of the milk at said second temperature until the appearance of the first signs of film grain formation; and thereafter cooling the milk to a temperature below the boiling point.

7. The method of preparing evaporated milk for storage in a sealed container which comprises heating the milk to a temperature of about 258° F. for at least the time necessary to obtain adequate sterility, lowering the temperature of the milk before film grain formation occurs to a temperature within the range between 235° F. and the boiling point, maintaining the milk with said temperature range until film grain formation occurs, and thereafter cooling it promptly to a temperature below the boiling point.

8. The method of preparing evaporated milk for storage in a sealed container which comprises heating said milk to a temperature of at least 250° F. for at least the time necessary to secure adequate sterility thereof, lowering the temperature of the milk to a temperature within the range between 235° F. and the boiling point before film grain formation occurs, maintaining the milk within said temperature range until film grain formation occurs, thereafter cooling it promptly to a temperature below the boiling point, and filling and sealing it into the container under aseptic conditions.

9. The method of preparing evaporated milk for storage in a sealed container which comprises heating said milk to a temperature of at least 250° F. for at least the time necessary to secure adequate sterility, lowering the temperature of the milk to a substantially lower temperature level before film grain formation occurs, filling the milk into the container aseptically, sealing the can under aseptic conditions, heating the milk within the can at a temperature within the range between 235° F. and the boiling point until film grain formation occurs, and thereafter cooling it promptly to a temperature below the boiling point.

10. The method of canning evaporated milk of exceptionally high heat stability which comprises subjecting the milk to a sterilization of at least 250° F. for the time necessary to assure adequate sterility, lowering the temperature of the milk to a temperature within the range between 235° F. and the boiling point before film grain formation occurs, adding a sterile chemical heat stabilizer to the milk when at said lowered temperature for the purpose of adjusting and correcting said heat stability and maintaining it within said temperature range until film grain formation appears, cooling it promptly to a temperature below the boiling point, thereafter filling it into a sterile can and sealing it into said can under aseptic conditions.

11. The method of canning evaporated milk, which comprises subjecting the milk to a temperature of at least 250° F. for the time necessary to assure adequate sterility, lowering the temperature of the milk below 250° F. before film grain formation occurs, aseptically killing the sterilized milk into a sterile can, sealing the can under aseptic conditions, introducing the sealed can into hot water under pressure at a temperature within the range between the boiling point and 235° F. until film grain formation appears in the milk within the can, and thereafter cooling the milk within the can promptly below the boiling point.

References Cited in the file of this patent

UNITED STATES PATENTS

| | | |
|---|---|---|
| 2,056,526 | Kennedy | Oct. 6, 1936 |
| 2,170,196 | Grindrod | Aug. 22, 1939 |
| 2,490,599 | Otting | Dec. 6, 1949 |

OTHER REFERENCES

Herrington: Milk and Milk Processing, New York, 1948, pages 256–257.